United States Patent [19]

Freud

[11] 4,390,925
[45] Jun. 28, 1983

[54] MULTIPLE-CAVITY VARIABLE CAPACITANCE PRESSURE TRANSDUCER

[75] Inventor: Paul J. Freud, Furlong, Pa.

[73] Assignee: Leeds & Northrup Company, North Wales, Pa.

[21] Appl. No.: 296,290

[22] Filed: Aug. 26, 1981

[51] Int. Cl.³ .............................................. H01G 7/00
[52] U.S. Cl. .................................. 361/283; 29/25.41; 73/718
[58] Field of Search .................. 361/283, 328; 73/718, 73/724; 29/25.41; 357/26; 324/71 SN

[56] References Cited

U.S. PATENT DOCUMENTS

| | | | |
|---|---|---|---|
| 3,397,278 | 8/1968 | Pomerantz | 174/52 |
| 4,257,274 | 3/1981 | Shimada et al. | 73/718 |
| 4,261,086 | 4/1981 | Giachino et al. | 29/25.41 |

Primary Examiner—B. A. Reynolds
Assistant Examiner—Alfred S. Keve
Attorney, Agent, or Firm—William G. Miller, Jr.; Harold Huberfeld; Frank J. Thomas

[57] ABSTRACT

A plurality of recesses and interconnecting paths are etched into the surface of a silicon wafer. A plate of borosilicate glass carrying thin-film metal deposits in a corresponding pattern is electrostatically bonded to the silicon to form a multiple-cavity variable capacitance pressure transducer.

11 Claims, 3 Drawing Figures

MULTIPLE-CAVITY VARIABLE CAPACITANCE PRESSURE TRANSDUCER

BACKGROUND OF THE INVENTION

This invention relates to a variable capacitance pressure transducer capable of handling higher pressures than would normally be tolerable with a single diaphragm type construction for the materials used. It also relates to a method for manufacturing such a transducer.

Pressure transducers such as those shown in U.S. Pat. No. 4,257,274, Shimada et al, issued on Mar. 24, 1981, have been developed to take advantage of the ease of manufacture and the favorable characteristics of silicon as a diaphragm material in combination with plates of borosilicate glass anodically bonded to its faces. The etched recesses in the diaphragm faces form with the glass plates opposing cavities which are very accurately dimensioned by the etching process so as to provide a pressure transducer structure which is stable with temperature changes. This type of pressure transducer also has benefits based on the considerable simplicity of its construction which makes it very easy to mass produce and which makes possible a miniaturization without sacrifice of the necessary characteristics of a good transducer.

A method for producing pressure transducers of the type described in the above mentioned patent is shown in U.S. Pat. No. 4,261,086 issued to Giachino on Apr. 14, 1981. This method calls for the manufacture of a number of transducers from a single wafer of silicon which is sliced into individual transducers as a last step in the manufacturing process with the resulting convenience for using batch processing techniques.

Pressure transducers of the type described in the above patents all utilize a process called electrostatic bonding, sometimes referred to as anodic bonding, to attach two pyrex glass sensing electrode support plates to opposite faces of a silicon disc into which are etched circular recesses. The diameter of the recesses defines the diameter of the diaphragm area while the depth of the recesses defines the capacitor plate spacing. The deflection of the diaphragm when a pressure is applied to one side is sensed by a capacitance increase on one side of the diaphragm and a capacitance decrease on the opposite side. The pressure range which can be measured by the device is determined by the deflections from unit of pressure on the diaphragm which, in clamped diaphragm theory, is proportional to the diameter to the 4th power divided by the thickness to the 3rd power.

$$d \propto pD^4/t^3$$

where
- D = diaphragm diamter
- t = thickness
- d = center point deflection
- p = pressure difference In order to change the range for the pressure transducers produced in accordance with the above technique, changes are made by changing the diaphragm diameter "D" and the diaphragm thickness "t". For instance, if the diameter is halved, the range is increased by 16 times, and if the thickness is doubled, the range is increased by 8 times. Theoretically, assuming a maximum deflection for the diaphragm, any range can be obtained by an appropriate choice of thickness and diameter. In practice, however, this is not the case since there are limitations in the value for thickness and diameter which can be practically achieved for a diaphragm. Thus, there is an upper pressure limit in the practical sense for a single diaphragm as established by these values.

For a fixed diameter the range can be increased by increasing the thickness of the diphragm. As the range increased, the forces acting on the cavity increase in proportion to the pressure times the cavity area. A pressure will be reached where these forces exceed the material strength even though a diaphragm thickness can be established for the proper deflection. In order to operate, the diameter of the cavity must be reduced instead of the diaphragm thickness being increased. The choice of dimensions will therefore be made first for strength of the device by specifying a diameter small enough to contain the pressure being measured. Second, a thickness of diaphragm is chosen to give the desired diaphragm deflection at the pressure being measured.

There is also a limitation in how small the diameter for the diaphragm can be made because as the diameter is decreased the capacitance of the unit is decreased as the square of the diameter. This becomes of significance when one considers that the electrical connections to the transducer always have some level of stray capacitance associated with them. Thus, as the diameter decreases and the device capacitance drops, the point is reached where the stray capacitance is too large compared with the device capacitance to make a linear measurement. A second problem arises from the use of small diameter diaphragms in that the measuring signal, which is typically an AC current, becomes too small because the impedance of the device is too high and the accuracy degrades because of signal to noise or temperature coefficient limitations.

It is an object of this invention to provide a transducer structure and a method of manufacture which can provide a unit which can exceed the upper pressure limits of the devices of the prior art.

SUMMARY OF THE INVENTION

A capacitive pressure transducer is provided by electrostatically bonding a diaphragm of semiconductive material to a plate of dielectric material. The diaphragm has material removed from a plurality of areas to form recesses and the plate has formed on its surface corresponding metallized areas. The cavities formed by the recesses and the bonded plate are interconnected by paths providing for an equalization of fluid pressure therebetween and the metallized areas are formed on the plate to form capacitor plates which are electrically interconnected as a common capacitor plate opposite the common plate formed by the diaphragm.

DETAILED DESCRIPTION

Figure 1:
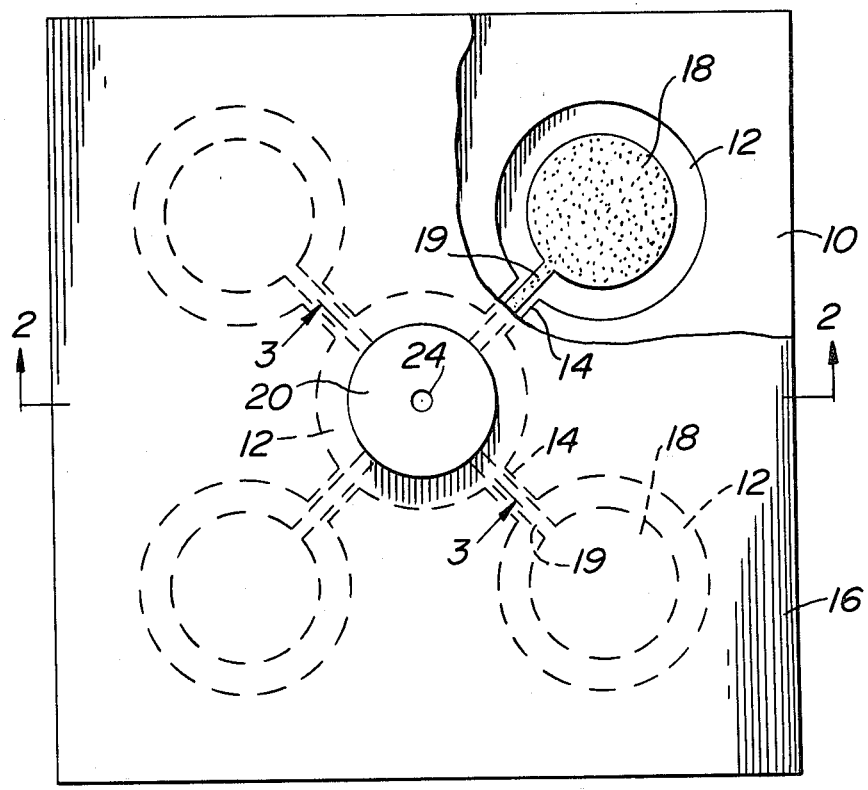
FIG. 1 is a top view of a single capacitive pressure transducer having five separate cavities.
Figure 2:
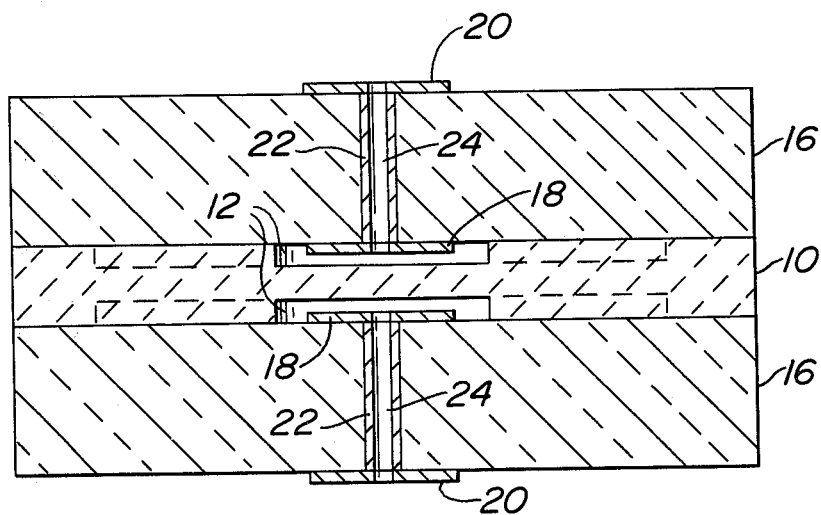
FIG. 2 is a front elevation in cross section of the transducer structure of FIG. 1 taken as indicated in FIG. 1.
Figure 3:
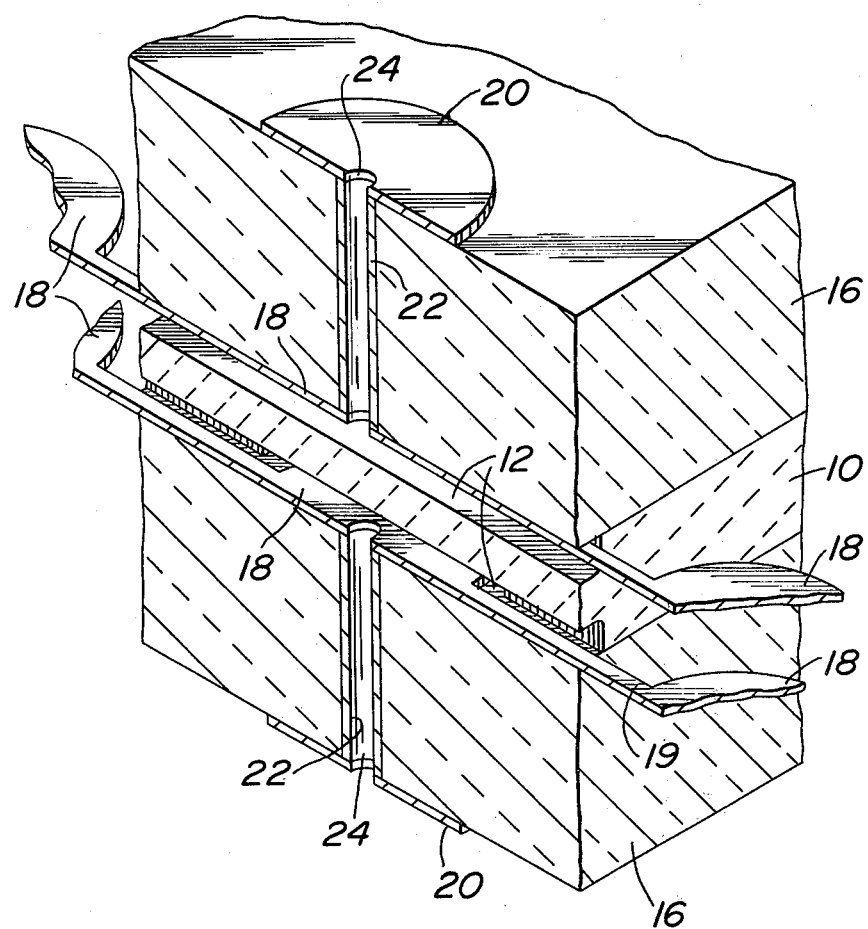
FIG. 3 is a perspective view in cross section taken as indicated in FIG. 1.

This invention may be best described by description of a different pressure transducer such as that shown in FIGS. 1, 2, and 3. That transducer utilizes as a diaphragm material an electrically conductive material such as a doped silicon which may be a single crystal 10 into which there is etched five circular recesses 12 on each of the two faces of the diaphragm structure 10. These recesses are interconnected by the grooves or passages 14 etched along paths which interconnect all of the recesses.

The silicon diaphragm structure 10 is flanked by dielectric plates 16 preferably of borosilicate glass. Those plates are electrostatically bonded to the diaphragm structure 10 in accordance with the electrostatic bonding procedure set forth in U.S. Pat. No. 3,397,278, issued to Pomerantz on Aug. 13, 1968. This bonding process provides a bond between the glass plates and the silicon diaphragm structure which approaches the strength of those materials, themselves.

Each of the glass plates 16 has a thin metal film 18 deposited on that surface of the plate facing the recesses of the diaphragm structure 10. That film is deposited in a pattern corresponding with the pattern of the recesses. Each of the circular, thin film deposits 18 are electrically connected to the other deposits by the interconnecting thin-film deposits along radial paths 19 so that all of the circular thin film deposits 18 form a single capacitor plate.

There is deposited on the other side of each of the glass plates at the location of the central cavity only a thin film deposit 20 with its circular metallized surface electrically connected by the respective film deposit 22 on the surface of the aperture 24. Thus, each of the peripheral cavities has associated with it a thin-film circular deposit forming a capacitor plate on the glass plates. All of the peripheral plates are electrically connected to the deposit at the central cavity and in turn connected by way of the film 22 in apertures 24 to a deposit 20 which serves as an external connection point. The fluid pressures to be compared are introduced through the central apertures 24 to the central cavities 12 and hence also introduced to all the peripheral cavities on the same side of the diaphragm structure by way of the interconnecting grooves or passages 14.

Electrical connection to the diaphragm structure 10 can be made directly to that structure at an exposed area around the periphery of the unit. Projecting tabs may be incorporated as part of the diaphragm structure for that purpose.

The above described structure for a variable capacitance differential pressure transducer may be advantageously manufactured by the steps summarized below.

From a doped single crystal silicon wafer with a thickness on the order of 0.02 cm., there is removed from its two opposing surfaces spaced areas 12 and interconnecting paths 14 as by an etching process such as by chemical etching to produce recesses of predetermined depth. The depth of the recesses is chosen to provide adequate capacitance change for the range of pressures involved and the areas of the recesses is determined in accordance with the requirements established for the range of pressure to be measured and the strength required.

On two separate plates of dielectric material such as borosilicate glass, there are deposited at a plurality of spaced areas 18 and interconnecting strips 19, thin-film deposits. These deposits are in a pattern corresponding with the plurality of circular recesses and interconnecting paths in the diaphragm structure. Thus, the circular thin-film deposits are interconnected electrically by the thin-film strips 19 to form a single capacitor plate.

Apertures 24 are formed, as by drilling in the center of the glass plates, as a fluid passage means through the glass plates. The surface of these apertures has deposited on it a film deposit of metal to provide an electrical connection through the plate to the thin-film deposits. That electrical connection is further enhanced by a thin-film deposit 20 in the area of the aperture to provide for external electrical connections.

The diaphragm structure 10 is then electrostatically bonded between the glass plates 16 so that the recesses 12 of the diaphragm structure 10 form with the glass plates separate cavities interconnected by the passages formed by the grooves or paths 14.

It will be evident to those skilled in the art that the transducer may be manufactured to have a single side. Thus, the recesses can be formed in only one side of the diaphragm and a single glass plate can be used with thin-film deposits on the corresponding spaced areas and interconnecting paths.

While the above described structure utilizes a silicon diaphragm and borosilicates glass plates, electrostatically bonded to the diaphragm structure, it will be understood by those skilled in the art that the silicon diaphragm can be replaced by other semiconducting materials and the glass plates can be replaced by other dielectric material while still allowing for electrostatic bonding between elements of the structure. It is important, however, that the semiconductor material and the dielectric material have a similar temperature coefficient of expansion. It has been found that silicon makes a good diaphragm material and borosilicate glass is very suitable for the plate structures and has an appropriately similar temperature coefficient of expansion as that of silicon.

What is claimed is:

1. A method for manufacturing a variable capacitance pressure transducer comprising the steps of:
    removing from spaced areas and interconnecting paths therebetween on a surface of a conductive wafer of semiconductor material a portion of the semiconductor material to form a plurality of connected recesses in the surface of the material;
    forming on the surface of a dielectric material spaced areas of electrically conductive material;
    forming an aperture through said dielectric material at one of said areas;
    coating the circumference of said aperture with an electrically conductive material; and
    electrostatically bonding the surface of the semiconductor material to the surface of the dielectric material so that the recesses of the semiconductor material are in adjacent spaced and substantially parallel alignment with the areas of electrically conductive material on the dielectric material, thereby to form in the resulting cavities electrical capacitors which have the semiconductor material as one plate thereof spaced from another plate comprising at least one of the electrically conductive areas so that the capacitance of the capacitor formed thereby is variable as a function of changes in the pressure difference acting on opposite sides of said wafer of semiconductor material.

2. A manufacturing method according to claim 1 wherein the removal of the semiconductor material in the spaced area is accomplished by etching.

3. A manufacturing method according to claim 2 wherein the semiconductor material is silicon, the dielectric material is borosilicate glass, and wherein the spaced areas of electrically conductive material are formed by application of thin films of metal to a surface of the glass dielectric material.

4. A method for manufacturing a variable capacitance differential pressure transducer comprising the steps of:

etching a plurality of shallow recesses and interconnecting grooves therebetween in opposing areas on each of the opposing sides of a conductive plate of silicon;

depositing on two plates of borosilicate glass an electrically conductive thin-film in areas and along interconnecting paths spaced to match the spacing of said recesses on said diaphragm surfaces;

forming in each of said plates in at least one of said areas, an aperture to provide a pressure transmitting passage through said wafers to all of said recesses;

coating said aperture with an electrically conductive film to provide electric contact to all of said deposits; and electrostatically bonding said plates to opposite sides of said diaphragm so that conductive areas are opposite the recesses of said diaphragm and in registration therewith, and so that all areas on each side of the diaphragm are exposed to the same fluid pressure.

5. A differential pressure transducer of the capacitor type comprising:

a pair of plates of inorganic electrically insulating material with a plurality of electrically conducting surfaces deposited over spaced areas on one surface of each of said plates;

a wafer of electrically conductive semiconductor material electrostatically bonded between said plates, said semiconductor material having a plurality of recesses in both of its faces in opposing relationship and in registration with said conductive surfaces so as to form with said plates a plurality of fluid tight cavities on opposing sides of the diaphragm;

means providing fluid communication with all of the cavities on each side of said semiconductor material so that the opposing sides of said semiconductor material may be exposed to different fluid pressures; and means providing electrical communication between all of the conducting surfaces on each of said plates so that the capacitors formed in each of the cavities between the semiconductor material and the conducting surfaces on any one side of the semiconductor material are all connected in parallel.

6. A pressure transducer as set forth in claim 5 in which:

the inorganic electrically insulating material is borosilicate glass;

the semiconductor material is a doped silicon;

the means providing fluid communication between the cavities on each side of the semiconductive material is a series of paths interconnecting those of said cavities on one side of the semiconductor material and an aperture through each of said plate to connect said cavities on each side to a different fluid pressure;

said electrically conductive surfaces are a thin-film deposit of metal; and said means providing electrical communication includes a thin-film deposit of metal along paths interconnecting said conducting surfaces.

7. A pressure transducer of the capacitor type comprising:

a wafer of inorganic electrically insulating material having a plurality of interconnected electrically conductive surfaces deposited over spaced portions of one surface of said wafer to form a capacitor plate thereon;

a semiconductor diaphragm structure having a plurality of spaced recesses, said structure being electrostatically bonded to said wafer so as to form with said wafer a plurality of cavities with the conductive surfaces of said wafer facing said diaphragm structure; and means providing fluid communication between said cavities so that the diaphragm structure acts as an opposing capacitor plate responsive to the application of changes in the fluid pressure in the cavities so as to change the capacitance between the diaphragm structure and the conductive area as an indication of the magnitude of the pressure change.

8. A pressure transducer as set forth in claim 7 in which the wafer of inorganic electrically insulating material is borosilicate glass and the semiconductor material of the diaphragm structure is a doped silicon.

9. A pressure transducer as set forth in claims 7 or 8 in which said means for providing fluid communication between said cavities includes a series of paths interconnecting said recesses.

10. A pressure transducer as set forth in claims 7 or 8 in which said recesses are produced by etching and in which said electrically conductive surfaces are produced by depositing a thin film of metal on the surface of said insulating material.

11. A pressure transducer as set fort in claim 9 in which there is included means for providing a fluid connection through said insulating material and connecting with said cavities.

* * * * *